US005471882A

United States Patent [19]
Wiggins

[11] Patent Number: 5,471,882
[45] Date of Patent: Dec. 5, 1995

[54] QUARTZ THICKNESS-SHEAR MODE RESONATOR TEMPERATURE-COMPENSATED PRESSURE TRANSDUCER WITH MATCHING THERMAL TIME CONSTANTS OF PRESSURE AND TEMPERATURE SENSORS

[75] Inventor: Robert B. Wiggins, Salt Lake City, Utah

[73] Assignee: Quartzdyne, Inc., Salt Lake City, Utah

[21] Appl. No.: 114,498

[22] Filed: Aug. 31, 1993

[51] Int. Cl.[6] ................................................ G01L 9/08
[52] U.S. Cl. ............................ 73/702; 73/708; 73/152; 73/154
[58] Field of Search .......................... 73/702, 151, 152, 73/154, 708, 703, 714, 756, 753, 754, 862.59; 310/338; 374/143

[56] References Cited

U.S. PATENT DOCUMENTS

| | | | |
|---|---|---|---|
| 3,355,949 | 12/1967 | Elwood et al. | 73/702 |
| 3,561,832 | 2/1971 | Karrer et al. | 310/9.6 |
| 3,617,780 | 11/1971 | Benjaminson et al. | 310/8.2 |
| 4,020,448 | 4/1977 | Corbett | 310/9.1 |
| 4,067,241 | 1/1978 | Corbett | 73/702 |
| 4,079,280 | 3/1978 | Kusters et al. | 310/318 |
| 4,160,183 | 7/1979 | Kusters et al. | 310/315 |
| 4,175,243 | 11/1979 | Corbett | 310/338 |
| 4,439,705 | 3/1984 | Corbett | 310/338 |
| 4,455,875 | 6/1984 | Guimard et al. | 73/708 |
| 4,485,323 | 11/1984 | Corbett | 310/338 |
| 4,535,638 | 8/1985 | EerNisse et al. | 73/862.59 |
| 4,547,691 | 10/1985 | Valdois et al. | 310/361 |
| 4,550,610 | 11/1985 | EerNisse | 73/702 |
| 4,562,375 | 12/1985 | Besson et al. | 310/338 |
| 4,607,530 | 8/1986 | Chow | 73/708 |
| 4,660,420 | 4/1987 | EerNisse | 73/702 |
| 4,754,646 | 7/1988 | EerNisse et al. | 73/702 |
| 4,802,370 | 2/1989 | EerNisse et al. | 73/702 |
| 4,936,147 | 6/1990 | EerNisse et al. | 73/702 |
| 5,012,151 | 4/1991 | EerNisse et al. | 310/346 |
| 5,221,873 | 6/1993 | Totty et al. | 310/361 |
| 5,231,880 | 8/1993 | Ward et al. | 73/702 |
| 5,299,868 | 4/1994 | Dennis et al. | |
| 5,302,879 | 4/1994 | Totty et al. | |

OTHER PUBLICATIONS

Benedict, Robert P., "Transient Temperature Measurement", *Fundamentals of Temperature, Pressure, and Flow Measurements*, 1977, pp. 265–271.

Besson, et al., "A Dual–Mode Thickness–Shear Quartz Pressure Sensor", *Ultrasonics Symposium*, 1991.

EerNisse, Errol P., "Quartz Resonator Pressure Gauge: Design and Fabrication Technology", Sandia Laboratories, Dec. 1978.

Kamal, M. M., "Expected Developments in Transient Testing", *JPT*, Aug. 1991, pp. 898–997.

Leach, Jerry, "5 MHZ BT Cut Resonators", Proceedings of the 24th Annual Symposium on Frequency Control, Apr. 1970, pp. 117–125.

*Primary Examiner*—Richard Chilcot
*Assistant Examiner*—Joseph L. Felber
*Attorney, Agent, or Firm*—Trask, Britt & Rossa

[57] ABSTRACT

A pressure transducer assembly for measuring fluid pressure. The transducer assembly includes a thickness-shear mode resonator pressure sensor and a thickness-shear mode resonator temperature sensor for temperature compensation of the pressure sensor. Both sensors are exposed to the pressurized fluid, and possess similar thermal time constants. The temperature sensor possesses a pressure sensitivity less than that of the pressure sensor, and a temperature sensitivity greater than that of the pressure sensor. The pressure and temperature sensors may be of similar size and configuration, and may be fabricated from the same material, such as quartz.

20 Claims, 1 Drawing Sheet

QUARTZ THICKNESS-SHEAR MODE RESONATOR TEMPERATURE-COMPENSATED PRESSURE TRANSDUCER WITH MATCHING THERMAL TIME CONSTANTS OF PRESSURE AND TEMPERATURE SENSORS

BACKGROUND OF THE INVENTION

1. Field of the Invention

The present invention relates generally to pressure transducers suitable for use downhole in oil, gas, geothermal and other wells, at the wellhead, in industrial applications, for portable calibration devices and in laboratory applications. Such transducers are herein defined as an assembly of sensors and electronic components capable of providing electrical signals which vary in a predictable manner responsive to pressure changes in a fluid with which the transducer is in communication. The term "sensor" as used herein refers to individual elements which are sensitive to a physical property such as temperature or pressure. The sensors to which the present invention is directed comprise quartz crystal resonators which exhibit changes in their frequency of vibration in response to changes in pressure or temperature to which the sensor is exposed. More specifically, by way of example and not limitation, the invention relates to pressure transducers which incorporate piezoelectrically-driven quartz crystal resonator sensors having a reduced tendency to err when subjected to pressure and temperature transients.

2. State of the Art

The general type of quartz crystal pressure transducer as disclosed herein includes at least a first sensor comprising a pressure sensitive quartz crystal resonator, a second sensor comprising a temperature sensitive quartz crystal resonator, and supporting electronics for driving the sensors and receiving and processing signals therefrom. A reference frequency quartz crystal resonator may also be employed.

The first sensor, as referenced above, changes frequency in response to changes in applied external pressure and temperature, while the output frequency of the second sensor is used to temperature compensate temperature-induced frequency excursions in the first sensor. The reference crystal, if used, generates a reference signal, which is only slightly temperature-dependent, against or relative to which the pressure- and temperature-induced frequency changes in the first sensor and the temperature-induced frequency changes in the second sensor can be compared. Means for such comparison as known in the art include frequency mixing or using the reference frequency to count the signals for the two sensors.

In prior art devices of the type described above, the first sensor is exposed to the fluid pressure sought to be measured, and all three sensors are thermally coupled to the fluid. The transducer (sensors plus electronics) is calibrated as a complete unit over the intended pressure and temperature range so that all temperature and pressure related effects at thermal equilibrium can be compensated for in the resulting calibration curve-fit coefficients. The transducer is at thermal equilibrium when the temperature of the pressure sensor and that of the temperature sensor are substantially the same. Exemplary patents for transducers using two crystal resonator sensors and a reference crystal, each assigned a function as described above, are U.S. Pat. No. 3,355,949 to Elwood, et al., U.S. Pat. No. 4,802,370 to EerNisse et al., and U.S. Pat. No. 5,231,880 to Ward et al. The disclosures of the foregoing patents are hereby incorporated herein by this reference thereto.

As discussed above and disclosed in the above-referenced patents, it is common for high precision pressure transducers to include temperature sensors to provide compensation for undesirable temperature sensitivity of the pressure sensor. Such compensation is, in prior art devices, usually adequate at thermal equilibrium but is unsatisfactory when the transducer experiences pressure or temperature transients in the fluid being measured. In the latter situations, prior art transducers exhibit errors in indicated pressure during and immediately following changes in pressure or temperature. The error typically appears as a pressure overshoot or undershoot which decays as the temperature of the transducer returns to equilibrium.

It is accepted in the art to quantify the response time of a sensor to a temperature change of its environment by a "thermal time constant". An excellent discussion of transient temperature measurement and rate of thermal response appears in Benedict, *Fundamentals of Temperature, Pressure and Flow Measurement*, 2d. Ed., pp. 265–270 (1977).

There are two recognized sources of temperature transients. The first source is a change in the external temperature to which the transducer is exposed. The second is a change in the pressure to which the transducer is exposed; since no fluid is incompressible, increasing the pressure of a fluid necessarily increases the temperature of the fluid because of the work which is done to compress the fluid. Decreasing pressure reverses this phenomenon, decreasing the temperature of the fluid. The phenomenon itself is generally called pressure-volume heating, or PV heating.

The pressure transducer disclosed in the above-referenced '880 patent is an example of a transducer which provides accurate, repeatable and stable pressure measurement at thermal equilibrium, but which exhibits pressure errors of some significance during extreme pressure or temperature transients. In the transducer design of the '880 patent, the pressure sensor is disposed inside a chamber of pressurized fluid to be measured, while the temperature sensor and reference crystal are located adjacent the fluid chamber in thermal contact therewith, but isolated from the pressure therein. It would be advantageous to improve the transient response of the pressure transducer of the '880 patent in order to enhance the accuracy of pressure measurements taken during extreme transient conditions such as might be experienced during a formation test of an oil or gas well immediately after perforation of the formation being tested, such perforation usually resulting (in the case of a successful well) in an extremely rapid pressure increase in the order of thousands of psi.

It has been observed that major causes of transient error in transducers of the design of the '880 patent are the distance between the pressure and the temperature sensors, and the differences in the thermal time constant of the two sensors. In a typical 4000 psi pressure step such as might be experienced during a formation test of an oil or gas well, the temperature of the fluid surrounding the pressure sensor will increase by about 1° C. The pressure sensor then takes about three minutes to return to equilibrium. Since the temperature sensor is not located inside the fluid, some time is required for the temperature increase to reach the temperature sensor. During this delay period, however, the heat generated by the pressure step is being dissipated into the surrounding transducer housing and other components, so that the temperature "pulse" is greatly attenuated before reaching the temperature sensor. Thus, in the present example, the temperature sensor will detect a temperature change of only about 0.2° C., but responds to this change very rapidly, returning to equilibrium in only about thirty seconds. As a result, the temperature sensor has a negligible effect on the pressure reading during the transient, and the indicated pressure is erroneous until the pressure sensor and temperature sensor return to thermal equilibrium.

The above-referenced '370 patent recognized the desirability of locating the temperature sensor within the fluid medium surrounding the pressure sensor so that the former is sensitive to temperature transients created in or applied to the fluid. It was further recognized that the temperature sensor should desirably be designed to have heat transfer or conductivity characteristics substantially the same as those of the pressure sensor. However, in the '370 patent the temperature sensor comprises a relatively small, discrete quartz crystal torsional tuning fork type resonator, while the pressure sensor comprises a much larger disk-shaped quartz thickness shear mode type resonator integrally assembled with its housing. Such dissimilarity in design and size precluded matching of the thermal time constants of the sensors themselves. However, some degree of thermal matching was accomplished in the device of the '370 patent by constructing the housing containing the temperature sensor and reference crystal of the same material and of similar wall thickness to the pressure sensor housing. The housing for the temperature sensor and reference crystal also provided isolation from the surrounding fluid pressure.

SUMMARY OF THE INVENTION

The present invention comprises a transducer assembly including two quartz resonator sensors which are enclosed in the same pressure housing and exposed to the same pressurized fluid. The pressure sensor is designed to change frequency primarily in response to pressure changes, and incidentally to a minor extent in response to temperature changes, while the temperature sensor is designed to change frequency in response to temperature. The temperature sensor may also change frequency in response to pressure changes, although it is desirable that this characteristic be minimized. The two sensors are similarly fabricated to provide similar thermal time constants, but different crystallographic orientations of quartz may be chosen for each sensor to maximize the desired sensitivity to the primary sensed parameter.

In the present invention, the temperature sensor is much more sensitive to changes in temperature than the pressure sensor, and it is also highly desirable that the temperature sensor be much less sensitive to pressure than the pressure sensor.

If a reference crystal is employed it can, using methods well known in the art, be designed to exhibit minimal change in frequency with temperature and so can be located outside of the pressure fluid, for example on the electronics side of a pressure-proof bulkhead having feedthroughs from the pressure and temperature sensors extending therethrough to the transducer electronics.

DETAILED DESCRIPTION OF THE PREFERRED EMBODIMENT

Figure 1:
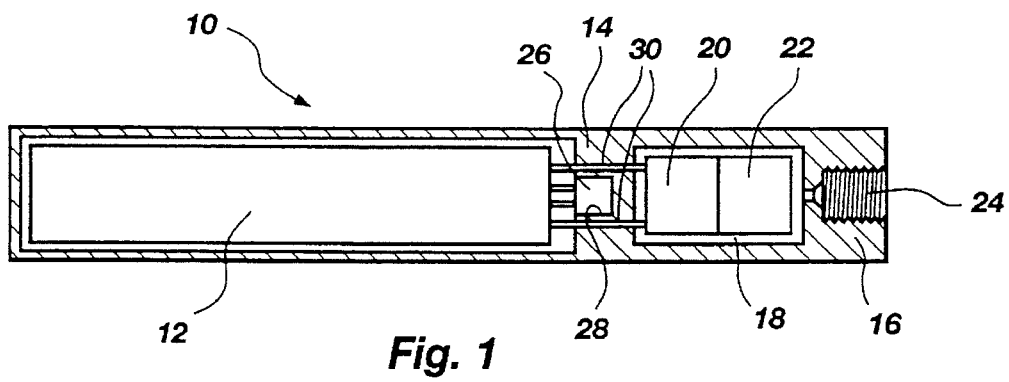
FIG. 1 comprises a side sectional schematic elevation of a pressure transducer in accordance with the present invention.

Referring now to FIG. 1 of the drawings, the pressure transducer 10 of the present invention is schematically depicted. Transducer 10 comprises an electronics housing 12 secured via a pressure-tight bulkhead 14 to a pressure housing 16 defining a chamber 18 in which pressure sensor 20 and temperature sensor 22 are disposed. Fluid pressure reaches chamber 18 via pressure port 24, which is exposed to the pressure to be measured. While temperature sensor 22 has been shown in FIG. 1 to be closer to pressure port 24, the positions of pressure sensor 20 and temperature sensor 22 in chamber 18 may, of course, be reversed. Reference crystal 26 is disposed in a metal can and located in a cavity 28 in bulkhead 14 adjacent to, but pressure-isolated from, chamber 18. Electrical feedthrough pins 30 extend through bulkhead 14 for transmission of electrical signals to and from pressure sensor 20 and temperature sensor 22.

To achieve the desired transient-response characteristics in the pressure transducer according to the present invention, as noted above the temperature sensor 22 as well as the pressure sensor 20 are subjected to fluid pressure in chamber 18 of pressure housing 16 by virtue of their mutually adjacent locations therein. In addition, as will be further described below, the two sensors are of similar size, mass and physical configuration and fabricated from the same quartz material, in order to provide similar thermal time constants and thus similar response times to temperature changes in the fluid being measured.

In the present invention, it is desired that the improved transient response be achieved without sacrificing the accuracy of the transducer at thermal equilibrium; therefore, it is preferred to decrease the pressure sensitivity of the temperature sensor to less than half of the pressure sensitivity of the pressure sensor, and most preferred to decrease such pressure sensitivity to less than twenty-five percent of that of the pressure sensor. Otherwise, algorithms which are commonly employed to compute pressure from the frequencies of the two sensors may show increased error of conformance, conformance being the difference between pressure indicated by the transducer and the pressure to which it is exposed. Conformance with a "true" value or a standard is known as "accuracy."

Pressure-related conformance problems experienced by a transducer do not necessarily lie in the accuracy of the standard employed in calibration or in the repeatability of a transducer being calibrated, but in the degree of convergence of a mathematical solution of a series of equations. Pressure is calculated from an algorithm which uses the pressure and temperature sensor frequencies and coefficients determined in calibration of the transducer. During calibration, the frequencies are measured at a plurality of known pressures at a plurality of stable temperatures. A series of equations is created, and the coefficients solved for in a well-known manner using mathematical matrices. If the temperature sensor of the transducer is too pressure-sensitive, the information obtained in calibration may not be sufficient for the desired solution, as the increased pressure sensitivity of the temperature sensor creates an ambiguity in the information. Thus, the error of conformance increases.

Figure 2:
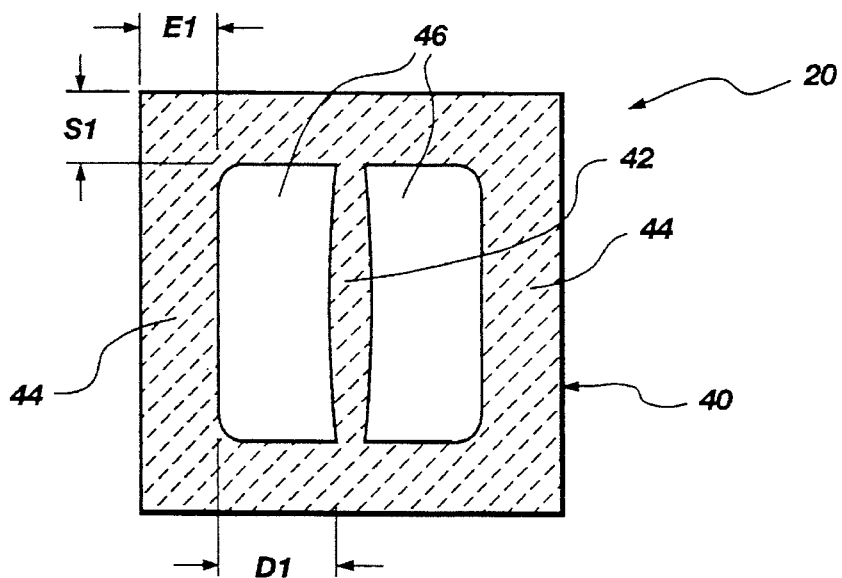
FIG. 2 comprises a side sectional elevation of a preferred embodiment of a quartz resonator pressure sensor for the pressure transducer of FIG. 1.

Referring now to FIG. 2 of the drawings, the preferred embodiment of the pressure sensor 20 is a hollow substantially cylindrical body 40 having an integral thickness-shear mode disc resonator 42 and closed ends 44, a cavity 46 being defined between each end 44 and resonator 42. The plane of resonator 42 is perpendicular to the longitudinal axis of body 40. While a bi-convex disc resonator 42 is illustrated in FIG. 2, the invention is not so limited. Plano/plano and plano/convex resonators have equal utility in practicing the invention, as do resonators having configurations other than circular or disc shape. Selection of a given design may be dictated by criteria well known to those skilled in the resonator design art.

The components of sensor 20 are machined from crystallographically-matched quartz, preferably of an AT-cut, BT-cut or other suitable orientation. Suitable conductors are then applied to the quartz by methods known in the art to initiate vibration of resonator 42 and for frequency output purposes. Body 40 has a sidewall thickness S1 and an end wall thickness E1. Each cavity 46 is of depth D1.

Dimensional characteristics of sensor 20 may be varied to adjust the pressure sensitivity thereof, by adjusting the stress experienced by the center portion of resonator 42 responsive to application of external pressure to body 40. For example and not by way of limitation, resonator thickness, shape and diameter may be varied, as may the outer diameter and sidewall thickness S1 of body 40, as well as the endwall thickness E1, cavity depth D1, and the interior configuration of ends 44 and thus of cavities 46.

Figure 3:
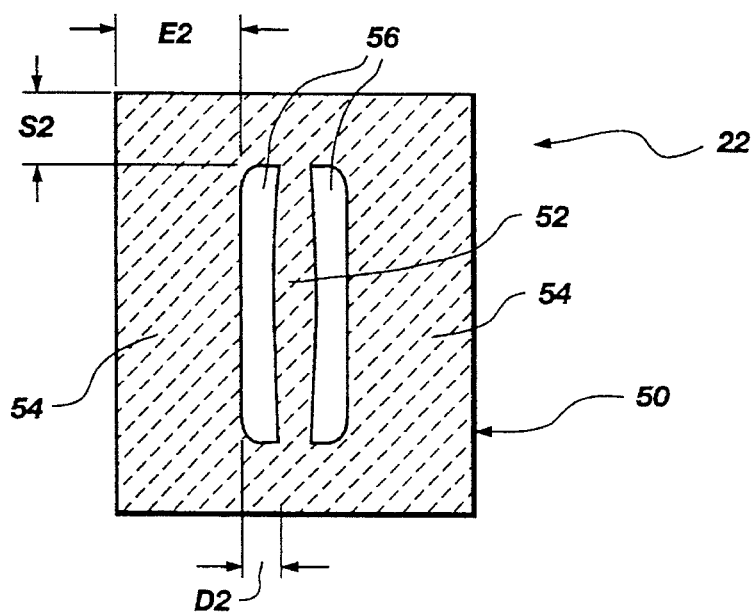
FIG. 3 comprises a side sectional elevation of a preferred embodiment of a quartz resonator temperature sensor for the pressure transducer of FIG. 1.

Referring now to FIG. 3 of the drawings, temperature sensor 22 is also of hollow, substantially cylindrical shape and of similar construction to pressure sensor 20, comprising a body 50 having an integral thickness-shear mode disc resonator 52 situated between two ends 54, each end 54 defining a cavity 56 adjacent resonator 52. As with resonator 42, resonator 52 may comprise a bi-convex resonator, be of plano/plano or plano/convex configuration, or be of other than circular or disc shape. Body 50 has a sidewall thickness S2 and an end wall thickness E2. Each cavity 56 is of depth D2.

The components of sensor 22 are machined from crystallographically-matched quartz, preferably of an AC-cut, BC-cut, or other suitable orientation. As with sensor 20, suitable resonator drive and output conductors are applied.

As in the case of sensor 20, dimensional characteristics of sensor 22 may be varied to adjust the pressure sensitivity thereof. However, while it is desirable to design sensor 20 for maximum pressure sensitivity consistent with accuracy, repeatability, and strength, sensor 22 would desirably be configured within such design constraints to possess minimum pressure sensitivity.

Sensors and resonators of the foregoing general design of the preferred embodiment and methods of fabrication thereof are known in the art, disclosed in the aforementioned U.S. Pat. No. 4,802,370 to EerNisse et al., as well as in U.S. Pat. Nos. 3,561,832; 3,617,780; 4,550,610; 4,660,420; 4,754,646; 5,221,873 and in EerNisse, "Quartz Resonator Pressure Gauge: Design and Fabrication Technology," Sandia Laboratories Report No. SAND78-2264 (1978), and so will not be further described herein.

It is also contemplated that the present invention has utility with respect to, and may be practiced with, alternative sensor and resonator configurations and structures, including without limitation those disclosed in U.S. Pat. Nos. 4,547,691 and 4,562,375, the disclosures of which are hereby incorporated herein by this reference.

Comparing the physical characteristics of pressure sensor 20 and temperature sensor 22 of the preferred embodiment of the invention, it is preferred that the diameter of sensors 20 and 22 be within a range of a factor of two, and that sidewall thicknesses S1 and S2 be substantially similar. Disc resonators 42 and 52 should also be similar in size and mass. It may be desirable, however, to select the thickness (and thereby the frequency and overtone) of each resonator 42 and 52 to optimize that particular sensor's response to pressure and temperature, respectively. Furthermore, when comparing endcap cavity depth D1 of pressure sensor 20 to endcap cavity depth D2 of temperature sensor 22, D2 would typically be much less than D1, for example by about a factor of four. Thus, temperature sensor 22 exhibits a much greater rigidity when subjected to external pressure than pressure sensor 20, and (all other parameters being substantially equal) is less pressure sensitive.

It will be apparent from the foregoing discussion that several considerations are involved in design and fabrication of sensors employed with the present invention. First, the relative pressure sensitivity of the sensors may be adjusted, as desired, within design constraints. In addition, it is desirable that the sensors 20 and 22 have similar thermal time constants, or that they be "thermally matched" to some degree. Such thermal matching may be provided by employing the same material for both sensors, and fabricating them to be of similar size and mass and subjected to (collocated in) the fluid being measured. Preferably the thermal time constants of sensors 20 and 22 should be matched within a factor of five, and most preferably within a factor of two. While some variations in sensor construction are necessary due to the differing purposes of sensors 20 and 22, such variations have reduced effect on thermal matching due to the presence of the conductors or electrodes extending into the sensors and associated with the resonators, which conductors or electrodes contribute significantly to the heat path from the sensor exterior to resonators 42 and 52. Thus, beneficial differences in sensor structure to address differences in sensor functions do not adversely affect the ability of the designer to thermally match the sensors to the degree desired for effective practice of the invention.

A preferred arrangement of the sensors and the drive and signal processing electronics of the transducer of the present invention can be as described in the aforereferenced Elwood et al. U.S. Pat. No. 3,355,949 or the Ward et al. U.S. Pat. No. 5,231,880, or any other suitable arrangement, such being well known in the art and therefore forming no part of the present invention.

While the present invention has been described in terms of a preferred embodiment, it is not so limited. Those of ordinary skill in the art will recognize and appreciate that many additions, deletions and modifications to the preferred embodiment may be made without departing from the scope of the invention as hereinafter claimed.

What is claimed is:

1. A transducer sensor assembly responsive to applied pressure, comprising:

a pressure housing defining a chamber containing a fluid under said applied pressure;

first pressure responsive sensor means located in said chamber and exposed to said fluid under said pressure for providing a frequency output responsive to variations of said pressure; and second pressure responsive sensor means possessing a pressure sensitivity less than one-half of that of said first sensor means and a temperature sensitivity different from that of said first sensor means, located in said chamber and exposed to said fluid under said pressure, for providing an output for temperature compensation of said pressure responsive frequency output of said first sensor means.

2. The transducer assembly of claim 1, wherein said second sensor means is fabricated from the same material as said first sensor means and is of substantially the same size and configuration as said first sensor means.

3. The transducer assembly of claim 1, wherein said first and second sensor means include quartz thickness-shear mode resonators.

4. The transducer assembly of claim 3, wherein said resonators are disc-shaped.

5. The transducer assembly of claim 3, wherein said resonators are situated in tubular, substantially cylindrical housings of the same material, of substantially the same diameter, and having substantially the same sidewall thickness.

6. The transducer assembly of claim 5, wherein said tubular, substantially cylindrical housings include endcaps defining cavities adjacent each side of said resonators, and the depth of said cavities adjacent said resonator of said first sensor means exceeds the depth of said cavities adjacent said resonator of said second sensor means.

7. The transducer assembly of claim 6, wherein said resonators are disc-shaped.

8. The transducer assembly of claim 3, wherein said resonator of said first sensor means is of an AT-cut crystallographic orientation, and said resonator of said second sensor means is of an AC-cut crystallographic orientation.

9. The transducer assembly of claim 8, wherein said resonators are disc-shaped.

10. The transducer assembly of claim 1, wherein said first and second sensor means possess thermal time constants matched within a factor of five.

11. The transducer assembly of claim 1, wherein said first and second sensor means possess thermal time constants matched within a factor of two.

12. The transducer assembly of claim 1, wherein said first and second sensor means possess substantially matched thermal time constants.

13. The transducer assembly of claim 1, wherein said second sensor means possesses a pressure sensitivity of twenty-five percent or less than the pressure sensitivity of said first sensor means.

14. The transducer assembly of claim 1, wherein said first and second sensors means are fabricated from the same material.

15. The transducer assembly of claim 14, wherein said material comprises quartz.

16. The transducer assembly of claim 14, wherein said first and second sensor means include resonators of substantially the same configuration.

17. The transducer assembly of claim 16, wherein said resonators comprise thickness-shear mode resonators.

18. A transducer sensor assembly responsive to applied pressure, comprising:

a pressure housing defining a chamber containing a fluid under said applied pressure;

first pressure responsive sensor means located in said chamber and exposed to said fluid under said pressure for providing a frequency output responsive to variations of said pressure; and second pressure responsive sensor means possessing a pressure sensitivity less than one-half of that of said first sensor means, located in said chamber and exposed to said fluid under said pressure, for providing an output for temperature compensation of said pressure responsive frequency output of said first sensor means;

at least one of said first and second sensor means including a resonator of non-circular configuration.

19. A transducer sensor assembly responsive to applied pressure, comprising:

a pressure housing defining a chamber containing a fluid under said applied pressure;

first pressure responsive sensor means including a thickness-shear mode resonator located in said chamber and exposed to said fluid under said pressure for providing a frequency output responsive to variations of said pressure; and second pressure responsive sensor means including a thickness-shear mode resonator and possessing a pressure sensitivity less than one-half of that of said first sensor means, located in said chamber and exposed to said fluid under said pressure, for providing an output for temperature compensation of said pressure responsive frequency output of said first sensor means.

20. A transducer sensor assembly responsive to applied pressure, comprising:

a pressure housing defining a chamber containing a fluid under said applied pressure;

first pressure responsive sensor means located in said chamber and exposed to said fluid under said pressure for providing a frequency output responsive to variations of said pressure; and second pressure responsive sensor means possessing a pressure sensitivity less than one-half of that of said first sensor means, located in said chamber and exposed to said fluid under said pressure, for providing an output for temperature compensation of said pressure responsive frequency output of said first sensor means.

* * * * *